United States Patent [19]
Takagi

[11] Patent Number: 5,698,930
[45] Date of Patent: Dec. 16, 1997

[54] ULTRASONIC WAVE MOTOR AND METHOD OF MANUFACTURE

[75] Inventor: Tadao Takagi, Yokohama, Japan

[73] Assignee: Nikon Corporation, Tokyo, Japan

[21] Appl. No.: 595,450

[22] Filed: Feb. 5, 1996

Related U.S. Application Data

[63] Continuation of Ser. No. 337,500, Nov. 8, 1994, abandoned.

[30] Foreign Application Priority Data

| Nov. 15, 1993 | [JP] | Japan | 5-308619 |
| Dec. 3, 1993 | [JP] | Japan | 5-339331 |

[51] Int. Cl.$^6$ .................................................. H01L 41/08
[52] U.S. Cl. ........................................ 310/323; 310/321
[58] Field of Search ............................ 310/323, 321, 310/328

[56] References Cited

U.S. PATENT DOCUMENTS

| 4,786,836 | 11/1988 | Tokushima | 310/323 |
| 5,039,899 | 8/1991 | Yamaguchi | 310/323 |
| 5,105,117 | 4/1992 | Yamaguchi | 310/323 |
| 5,140,214 | 8/1992 | Kimura et al. | 310/323 |
| 5,166,572 | 11/1992 | Ohnishi | 310/323 |
| 5,191,688 | 3/1993 | Takizawa et al. | 310/323 X |
| 5,416,375 | 5/1995 | Funakubo et al. | 310/323 |

FOREIGN PATENT DOCUMENTS

| 0257476 | 10/1988 | Japan | 310/323 |
| 0277477 | 11/1988 | Japan | 310/323 |
| 5115185 | 5/1993 | Japan | 310/323 |

OTHER PUBLICATIONS

*Ultrasonic Motors Theory and Applications*, S. Usha, Y. Tomikawa, M. Jurosawa and N. Nakamura, all pages, Clarendon Press, Oxford, 1993.

*Piezoelectric Linear Motors for Application to Driving a Light Pick–Up Element*, Y. Tomikawa, M. Aoyagi, T. Ogasawara, A. Yabuki, Yamagata University, (pp. 393–398) (1993)(with English translation (p.394 (b) excerpt)).

*Primary Examiner*—Mark O. Budd

[57] ABSTRACT

An ultrasonic motor having an elastic body provided with a base part and two driving force output members. The driving force output members are provided with slide members. Two piezo-electric elements for generating longitudinal oscillation L1 mode and flex oscillation B4 mode are arranged on the base part. The slide members can be of a variety of configurations and patterns, including, for example, two strips placed either lengthwise or widthwise across the driving force output members. Further, the driving force output members can either be an integral part of the elastic body or can be formed in a separate process and then joined to the elastic body.

14 Claims, 8 Drawing Sheets

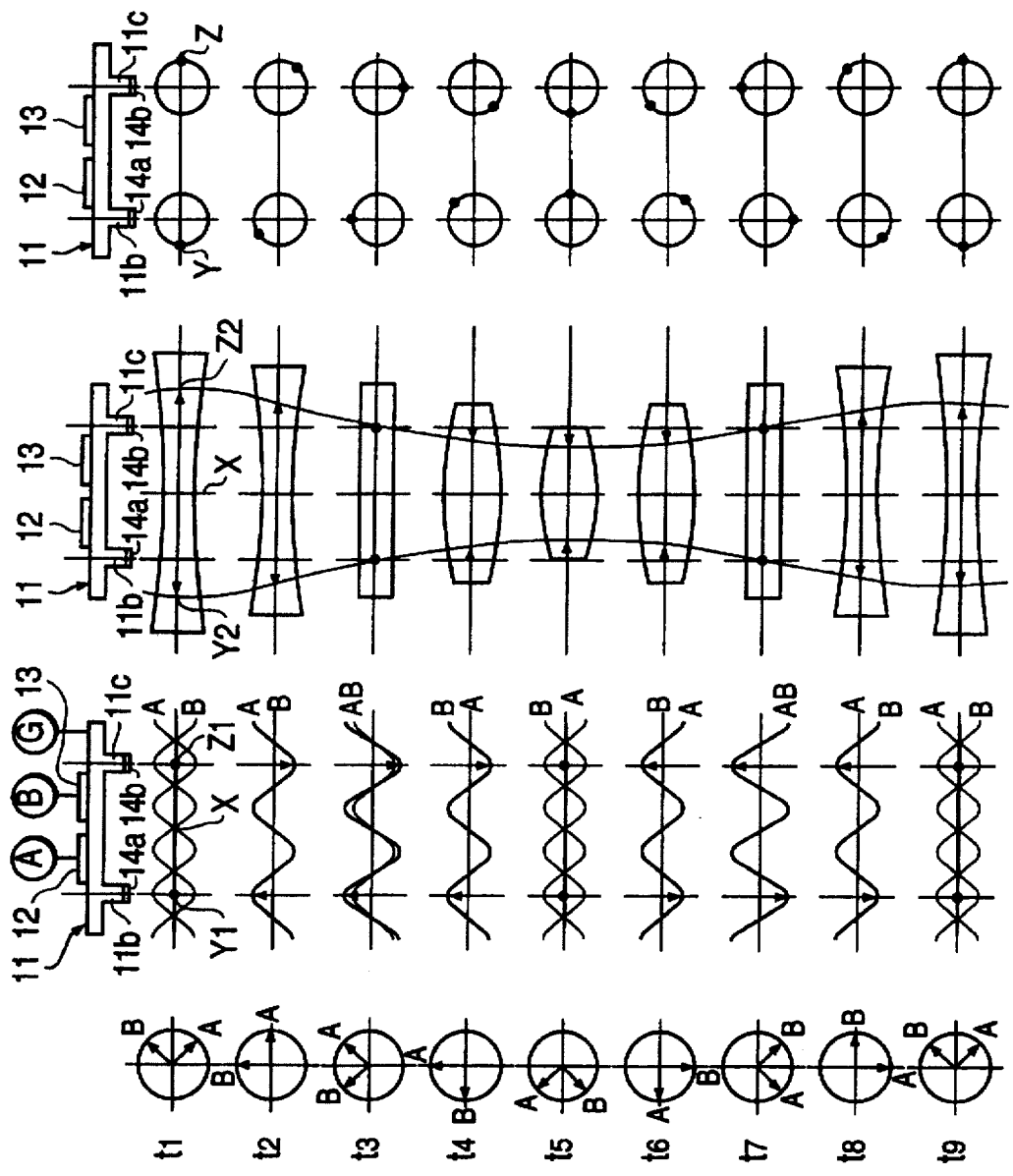

ULTRASONIC WAVE MOTOR AND METHOD OF MANUFACTURE

This application is a continuation of application Ser. No. 08/337,500, filed Nov. 8, 1994, now abandoned.

BACKGROUND OF THE INVENTION

1. Field of the Invention

The present invention relates to an ultrasonic motor that produces elliptical movement in a rod-shaped elastic body, and in particular, relates to an ultrasonic motor which has a two-phase drive having a longitudinal oscillation mode and a flex oscillation mode.

2. Description of the Related Art

FIG. 8 is a side view of a conventional linear type ultrasonic motor. Art excitation transformer 102 depends from one side of a rod-shaped elastic body 101, while a damping regulator 103 depends from the other side of the rod-shaped elastic body 101. A vibrator 102a is connected to the excitation transformer 102 and, similarly, a vibrator 103a is connected to the damping regulator 103. An alternating current vibrator 102b excites the vibrator 102a causing the rod-shaped elastic body 101 to oscillate. This oscillation is a progressive wave propagated on rod-shaped elastic body 101. The progressive wave drives a moving body 104, which is pressure joined to rod-shaped elastic body 101.

The oscillation of rod-shaped elastic body 101 is transmitted to the vibrator 103a through the damping regulator 103. The vibrator 103a converts the energy imparted by the oscillation to electric energy. A load 103b, connected to the vibrator 103a, absorbs the oscillations by consuming the electric energy. This prevents the production of standing waves of a mode inherent to rod-shaped elastic body 101 by suppressing the reflection of the end surface of rod-shaped elastic body 101.

The linear type ultrasonic motor, as shown in FIG. 8, only has the moveable range of the moving body 104, thus the rod-shaped elastic body 101 must be long to produce an acceptable range of movement. Further, as the entire body of that rod-shaped elastic body 101 vibrates, the linear type ultrasonic motor must be made to an excessively large scale. In addition, in order to prevent the generation of standing waves, a damping regulator 103 is necessary.

In order to resolve these problems, a variety of self-advancing ultrasonic motors have been proposed. For example, a "heteromorphic degeneracy longitudinal L1-flex B4 mode-flat plate motor" is listed in "222 Piezo-electric Linear Motors for Application to Driving a Light Pickup Element" of the "Proceedings of the Fifth Electromagnetic Force Dynamics Symposium", Jun. 9–11, 1993.

FIG. 9(A) is a front view of a heteromorphic degeneracy longitudinal L1-flex B4 mode-flat plate motor. FIG. 9(B) is a side view of a heteromorphic degeneracy longitudinal L1-flex B4 mode-flat plate motor. FIG. 9(C) is a top view of a heteromorphic degeneracy longitudinal L1-flex B4 mode-flat plate motor. An elastic body 1, composed of a rectangular flat plate shaped base part 1a, has a pair of protruding parts 1b and 1c formed on one surface. A pair of piezo-electric elements 2 and 3 are fixed to the other side of the base part 1a of elastic body 1, and generate a longitudinal oscillation L1 mode and a flex oscillation B4 mode. The protruding parts 1b and 1c of the elastic body 1 are provided on the antinode position of the flex oscillation B4 movement, which is generated on base part 1a, and are set in movement members, such as guide rails (not shown).

SUMMARY OF THE INVENTION

Accordingly, it is an object of the present invention to provide an ultrasonic motor able to produce an acceptable range of movement.

It is another object of the invention to provide an ultrasonic wave motor able to produce an acceptable range of movement without having to vibrate the entire elastic body.

It is a further object of the present invention to provide an ultrasonic motor of reduced scale able to provide an acceptable range of movement.

It is yet a further object of the invention to provide an ultrasonic motor that does not require a damping regulator.

Additional objects and advantages of the invention will be set forth in part in the description which follows, and, in part, will be obvious from the description, or may be learned by practice of the invention.

Objects of the present invention are achieved in an ultrasonic motor comprising an elongated elastic body having a first surface and a second surface; two piezo-electric elements for receiving input voltages, the piezo-electric elements being attached to the first surface of the elongated elastic body; first and second driving force output members depending from the elongated elastic body; a first slide member affixed to the first driving force output member; and a second slide member affixed to the second driving force output member.

Objects of the present invention are also achieved in an ultrasonic motor comprising an elongated elastic body having a first surface and a second surface; two piezo-electric elements for receiving input voltages, the piezo-electric elements being attached to the first surface of the elongated elastic body; and first and second driving force output members attached to the elongated elastic body.

Objects of the present invention are also achieved in a method of constructing an ultrasonic motor comprising affixing a first and second piezo-electric element to a first side of an elastic body and affixing a first and second driving force output member to a second side of the elastic body.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 2(A)–(D) are diagrams showing the operation of an ultrasonic motor according to the preferred embodiments of the present invention.

DESCRIPTION OF THE PREFERRED EMBODIMENTS

Figure 1A:
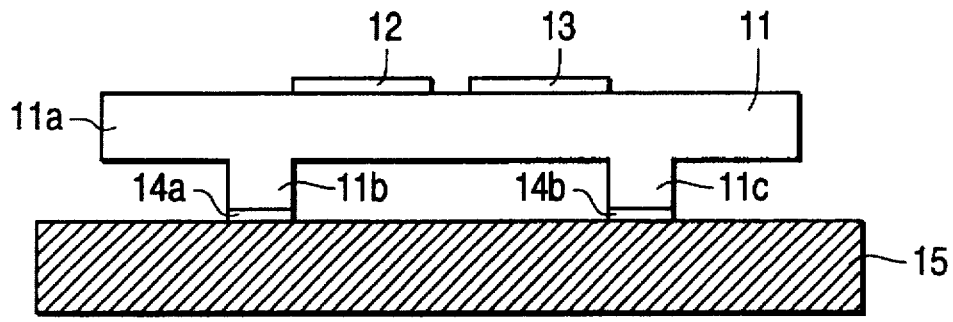
FIG. 1(A) is a side view of an ultrasonic motor according to a first embodiment of the present invention.

Reference will now be made in detail to the present preferred embodiments of the present invention, examples of which are illustrated in the accompanying drawings, wherein like reference numerals refer to like elements throughout.

FIG. 1(A) is a side view of an ultrasonic motor in accordance with a first embodiment of the present invention. An elastic body 11 is provided with a base part 11a and two driving force output members 11b and 11c connected to a moving body 15. The driving force output members 11b and 11c are provided with slide members 14a and 14b, respectively. Two piezo-electric elements 12 and 13, for generating longitudinal oscillation L1 mode and flex oscillation B4 mode are arranged on the base part 11a. The functions of these elements are similar to those ascribed to similar elements in the prior art, set forth above.

Figure 1B:
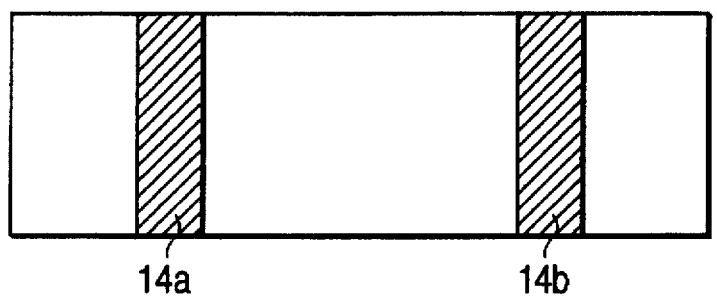
FIG. 1(B) is a bottom view of an ultrasonic motor according to the first embodiment of the present invention.

FIG. 1(B) shows a bottom view of the ultrasonic motor. The slide members 14a and 14b are provided along the entire length of the driving force output members 11b and 11c.

Figure 1C:
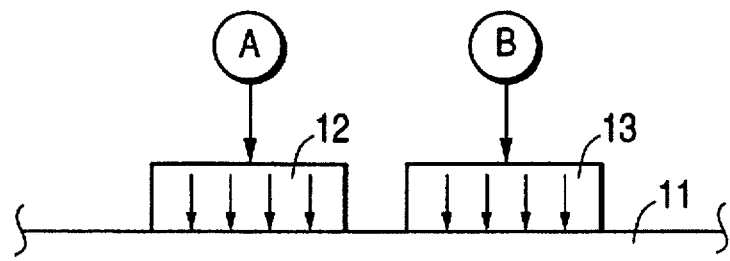
FIG. 1(C) is a diagram of an ultrasonic motor according to the first embodiment of the present invention.

FIG. 1(C) shows the polarization of the piezo-electric elements 12 and 13 as used in the ultrasonic motor in accordance with the first embodiment. The piezo-electric elements 12 and 13 receive two-phase input voltages A and B which are applied in a manner described hereinafter.

A pair of slide members 14a and 14b are affixed to the driving force output members 11b and 11c, for example, by epoxy adhesive. In the first preferred embodiment of the present invention, slide members 14a and 14b are formed of a synthetic resin to heighten their durability. In particular, it is preferable to have a material containing ethylene tetrafluoride, for example, a material containing 80% (W) ethylene tetrafluoride, 15% (W) glass fiber, and 5% (W) molybdenum disulfide.

If the ultrasonic motor (elements 11–14) is the self-advancing type, the moving body 15 is a fixed member, and conversely, if the ultrasonic motor (elements 11–14) is fixed, the moving body 15 is a driven member.

The ultrasonic motor according to the first preferred embodiment has a configuration in which composite oscillations of flex oscillations and longitudinal oscillations occur by the application of two-phase high frequency voltages A and B (FIG. 1C) on the piezo-electric elements 12 and 13. This produces a drive force by generating elliptical movement on the ends of driving force output members 11b and 11c. In the first preferred embodiment of the present invention, the two piezo-electric elements 12 and 13 are polarized so that they have mutual polarity in the same direction, and the two-phase high frequency voltages A and B are applied with a temporal phase difference of c/2. However, the polarization of the two piezo-electric elements 12 and 13 may also be in mutually opposite directions.

FIG. 2(A) shows the temporal changes of the two-phase high frequency voltages A and B that are supplied to the ultrasonic motor at times t1–t9. In FIGS. 2(A)–2(D), the horizontal axis indicates the effective value of the high frequency voltage. FIG. 2(B) illustrates the deformation of a cross section of the ultrasonic motor, showing the changes over time (t1–t9) of the flex oscillations which are generated by the ultrasonic motor. FIG. 2(C) illustrates the deformation of a cross section of the ultrasonic motor, showing the changes over time (t1–t9) of the longitudinal oscillations generated by the ultrasonic motor. FIG. 2(D) shows the changes over time (t1–t9) of the elliptical movement that the ultrasonic motor generates in driving force output members 11b and 11c.

At time t1, as indicated in FIG. 2(A), high frequency voltage A generates a positive voltage, and high frequency voltage B generates an equal positive voltage. Looking at FIG. 2(B), the flex movement, based on high frequency voltages A and B, cancel each other out, and points Y1 and Z1 display zero amplitude. During this time, as indicated in FIG. 2(C), a longitudinal oscillation, based on the high frequency voltages A and B, is generated along the length of the elastic body 11. Points Y2 and Z2 indicate the elongation of the elastic body 11, while point X indicates the center of the elastic body 11. As shown in FIG. 2(D), both of the aforementioned oscillations are combined, with the combination of points Y1 and Y2 determining the movement of point Y on the driving force output member 11b, and also, with the combination of the movement of points Z1 and Z2 determining the movement of point Z on the driving force output member 11c.

At time t2, the high frequency voltage B is zero, and the high frequency voltage A generates a positive voltage, as indicated in FIG. 2(B). The flex movement generated by the high frequency voltage A causes the point to oscillate in the positive direction, and the point Z1 to oscillate in the negative direction. Moreover, as indicated in FIG. 2(C), a longitudinal oscillation is generated by the high frequency voltage A. This causes the point Y2 and the point Z2 to contract with respect to each other. As a result, both the aforementioned oscillations combine, and points Y and Z move by circulating to the right, as shown in FIG. 2(D).

At time t3, the high frequency voltage A generates positive voltage, and the high frequency voltage B generates an equal negative voltage. The flex movement caused by the high frequency voltages A and B combine and are amplified, causing the point Y1 to be moved in the positive direction. Conversely, point Z1 is moved in the negative direction. Moreover, the longitudinal flex caused by high frequency voltages A and B cancel each other out, and points Y2 and Z2 return to their original positions. As a result the points Y and Z move by circulating to the right.

At time t4, the high frequency voltage A becomes zero, and the high frequency voltage B generates a negative voltage. At the same time, flex movement is generated by the high frequency voltage B, causing the amplitude of point Y1 to be lower than at time t3, and the amplitude of point Z1 to be lower than at time t3. Moreover, a longitudinal flex is generated by the high frequency voltage B, and points Y2 and Z2 contract. As a result of this, the points Y and Z move by circulating to the right.

At time t5, the high frequency voltage A generates a negative voltage, and the high frequency voltage B generates an equal negative voltage. This causes the flex movement based on the high frequency voltages A and B to cancel each other out, and points Y1 and Z1 display zero amplitude. Moreover, the longitudinal flex based on the high frequency voltages A and B cause the points Y2 and Z2 to contract. As a result of this, points Y and Z move by circulating to the right.

Following the changes for times t6–t9, flex movement and longitudinal flex are generated, and the points Y and Z move by circulating to the right, thereby undergoing elliptical movement.

According to the principles above, this ultrasonic motor is configured to generate a drive force by generating an elliptical movement at the ends of the take-off members 11a and 11b. Consequently, when applying the ends of driving force output members 11b and 11c to a moving body 15, such as a stator (not shown), elastic body 11 self-advances in relation to the moving body 15.

Figure 1D:
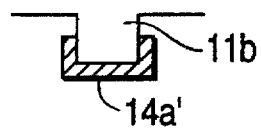
FIG. 1(D) is a partial side view of an ultrasonic motor according to the first embodiment of the present invention.

Although the first embodiment of the present invention has been described with respect to a specific configuration, it will be recognized that the first embodiment is not limited to the specific configuration. For example, although the first embodiment has been described with respect to the use of slide members 14a and 14b exactly aligning with the footprints of driving force output members 11b and 11c, as shown in FIG. 1(D), the slide members 14a and 14b may be formed so that they wrap around driving force output members 11b and 11c (not shown) respectively.

Figure 3A:
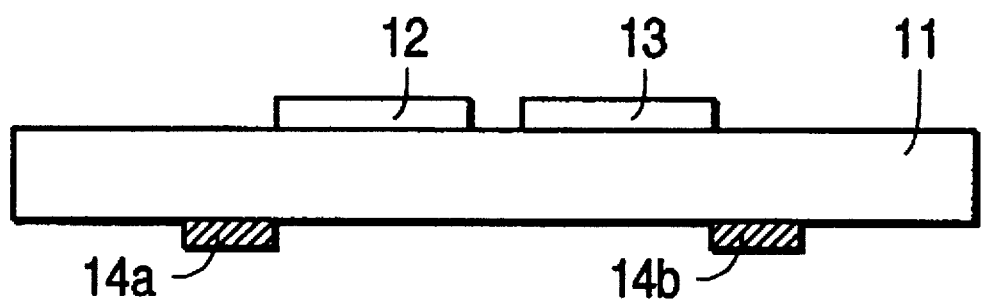
FIG. 3(A) is a side view of an ultrasonic motor according to a second embodiment of the present invention.

FIG. 3(A) shows a side view of a second embodiment of an ultrasonic motor according to the present invention. In the ultrasonic motor according to the second embodiment, the driving force output members 11b and 11c are dispensed with, and the slide members 14a and 14b are directly affixed to the take-off position on elastic body 11.

Figure 3B:
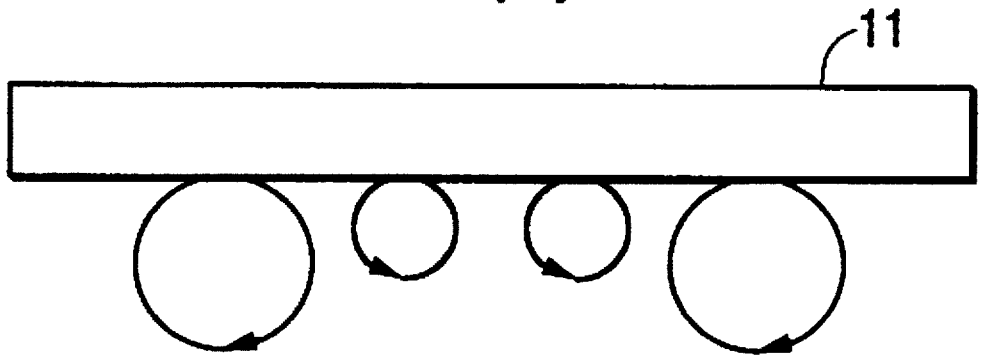
FIG. 3(B) is a diagram showing the operation of an ultrasonic motor according to the second embodiment of the present invention.

FIG. 3(B) shows the relative movement of multiple locations on the elastic body 11. Points Y and Z, at the ends of driving force output members 11b and 11c, as shown in FIG. 2(D), corresponding to the outer circles have a large size radius. However, it is possible to produce drive even if slide members 14a and 14b are affixed directly to the elastic body 11, as shown by the two smaller inner circles.

Although the second embodiment of the present invention has been described with respect to a specific configuration, it will be recognized that the second embodiment is not limited to the specific configuration. For example, although the second embodiment has been described with respect to a specific configuration of the slide members 14a and 14b, it will be recognized that different configuration and locations are useful for different applications.

Figure 4A:
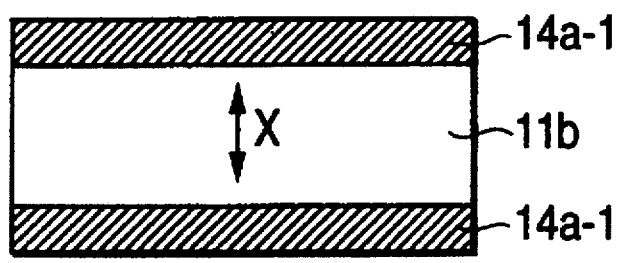
FIGS. 4(A)–4(D) are diagrams showing alternative configurations of an ultrasonic motor according to the present invention.
Figure 4B:
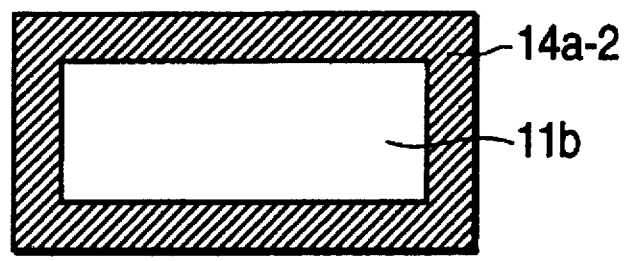

Further, although the first two embodiments have been described as using rectangular slide members 14a and 14b, other shapes and configurations, forming raised patterns, are desirable for use in specific situations. For example, FIG. 4(A) shows a two band shaped slide member 14a-1 provided longitudinally along the driving force output member 11b and transverse the direction of movement (as shown by the arrow X) of driving force output member 11b. FIG. 4(B) shows a slide member 14a-2, having a frame shape provided on the periphery of driving force output member 11b. The configurations shown in FIGS. 4(A) and 4(B) can eliminate the abrasions caused by dirt and dust that accumulates between the ultrasonic motor and an attached moving body 15 (not shown).

Figure 4C:
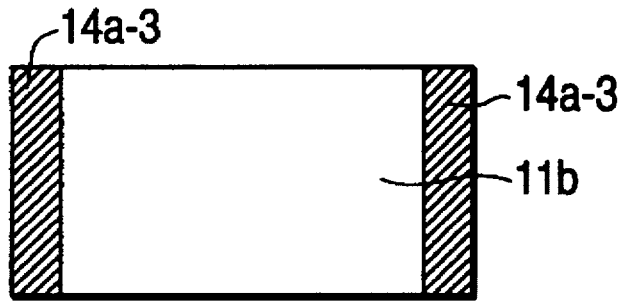
Figure 4D:
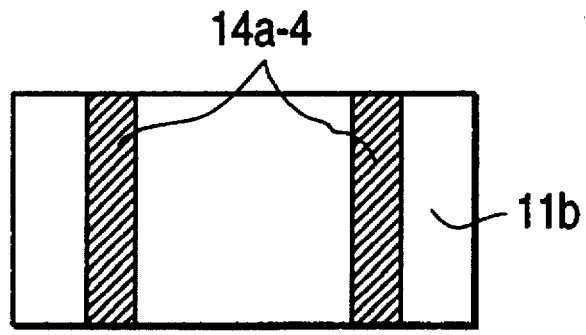

FIG. 4(C) shows a band shaped slide member 14a-3 provided on both edges of the direction of movement (arrow X in FIG. 4(A)) of driving force output member 11b. FIG. 4(D) shows a band shaped slide member 14a-4 provided on the inside, rather than on the edges, of the driving force output member 11b parallel to the direction of movement of driving force output member 11b. In the configurations shown in FIGS. 4(B) and 4(C), the contact surface with the ultrasonic motor (elements 11–14) and with moving body 15 (not shown) is long and narrow, thus providing a stable drive.

Figure 5A:
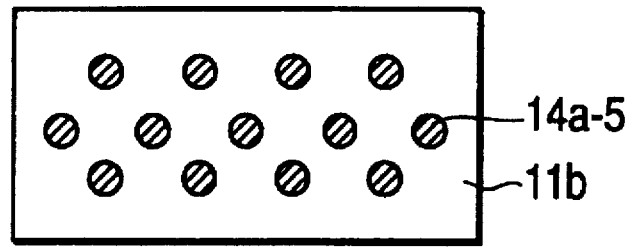
FIGS. 5(A)–5(D) are diagrams showing alternative configurations of an ultrasonic motor according to the present invention.
Figure 5B:
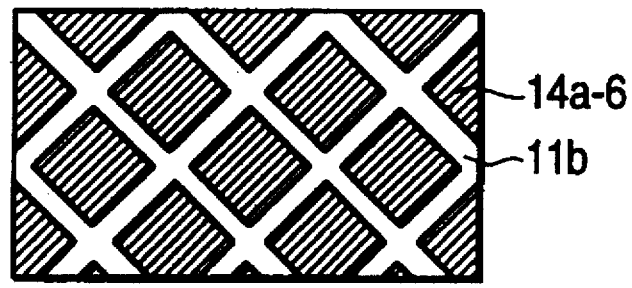

FIG. 5(A) shows a plurality of dot shaped slide members 14a-5 provided on the abbreviated front surface of driving force output member 11b. FIG. 5(B) shows slide members 14a-6 having grooves formed in a diagonal direction relative to driving force output member 11b. The configurations as shown in FIGS. 5(A) and 5(B) give acceptable performance even if there is water on the contact surface between the ultrasonic motor (elements 11–14) and moving body 15 (not shown).

Figure 5C:
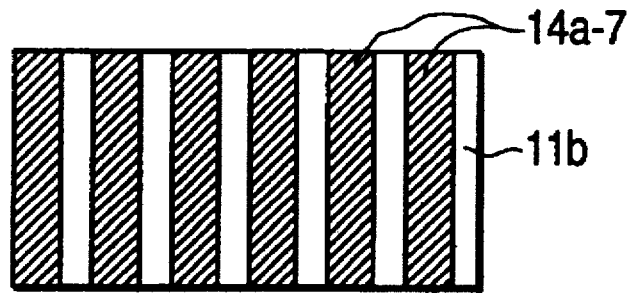
Figure 5D:
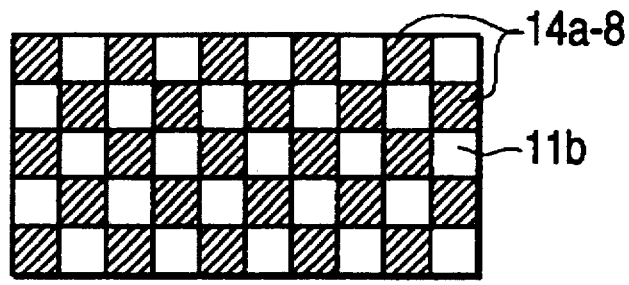

The configuration shown in FIG. 5(C) has many band shaped slide members 14a-7. FIG. 5(D) shows the use of grid shaped slide members 14a-8 on driving force output member 11b.

While the different configurations have been explained with reference to slide member 14a, the same shapes can be used for sliding part 14b on driving force output member 11c.

As described in detail above, in accordance with the first and second embodiments of the present invention, because a slide member is provided in the output take-off position, friction is reduced on the sliding surface between the output take-off position and the moving body 15, thereby improving durability.

Figure 6A:
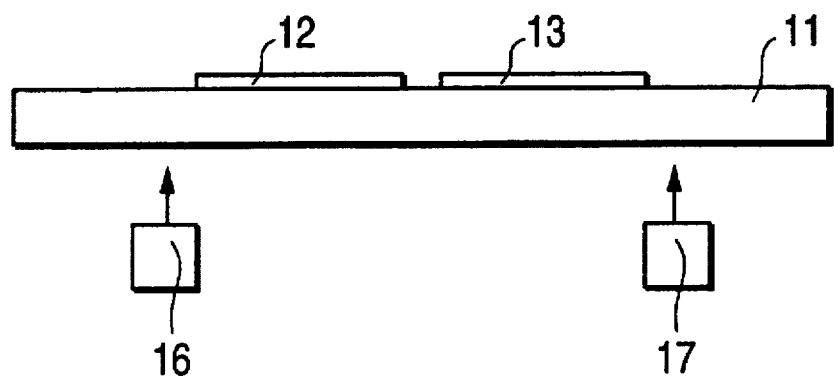
FIG. 6(A) is an exploded side view of an ultrasonic motor according to a third embodiment of the present invention.
Figure 6B:
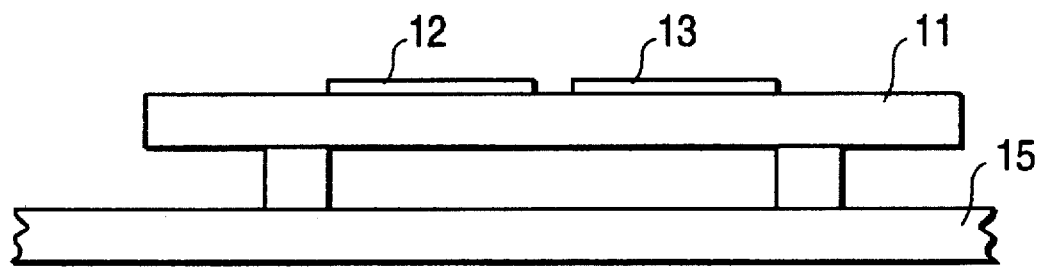
FIG. 6(B) is a side view of an ultrasonic motor according to the third embodiment of the present invention.

FIG. 6(A) shows a third embodiment of an ultrasonic motor according to the present invention. A pair of piezoelectric elements 12 and 13, for the purpose of generating longitudinal vibration L1 mode and flex vibration B4 mode, are arranged on an elastic body 11. Two physically independent take-off members 16 and 17 are arranged on the lower surface of the elastic body 11. Preferably, the material of the take-off members 16 and 17 is the same material as in the elastic body 11.

The take-off members 16 and 17 are preferably affixed to the elastic body 11 by an epoxy glue adhesive. It, therefore, is no longer necessary to machine the protruding parts by mechanical processing, as is required with the wave motor as described with respect to the first embodiment and in the prior art. Further, there is no decrease in performance because of the stress induced during the machining stage. Moreover, because the material of the take-off members 16 and 17 is the same material as used in the elastic body 11, there is no relative deformation during use due to temperature changes.

Figure 6C:
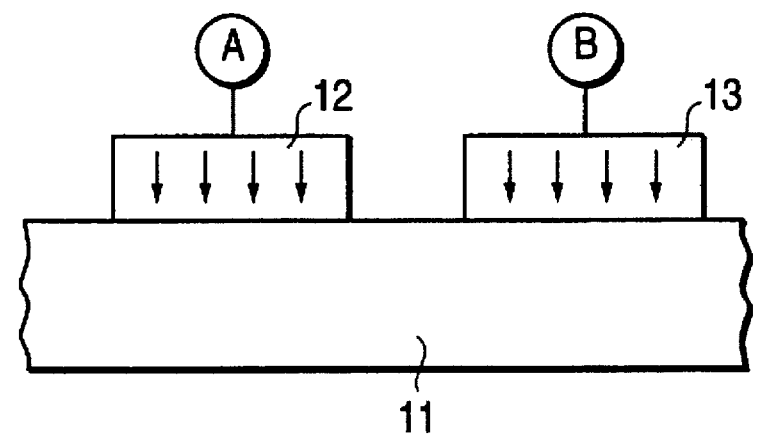
FIG. 6(C) is a diagram of an ultrasonic motor according to the third embodiment of the present invention.

Voltage is applied as described above with respect to the first embodiment, and as shown in FIG. 6(C), such that composite vibrations of flex vibrations and longitudinal vibrations occur and drive force is produced thereby generating elliptical movement on the ends of the take-off members 16 and 17.

Although the third embodiment of the present invention has been described with respect to a specific configuration, it will be recognized that the third embodiment is not limited to the specific configurations. For example, while no slide members are shown on the ends of the driving force output members 16 and 17, any of the configurations as described in relationship with the previous embodiments may be used.

Figure 7A:
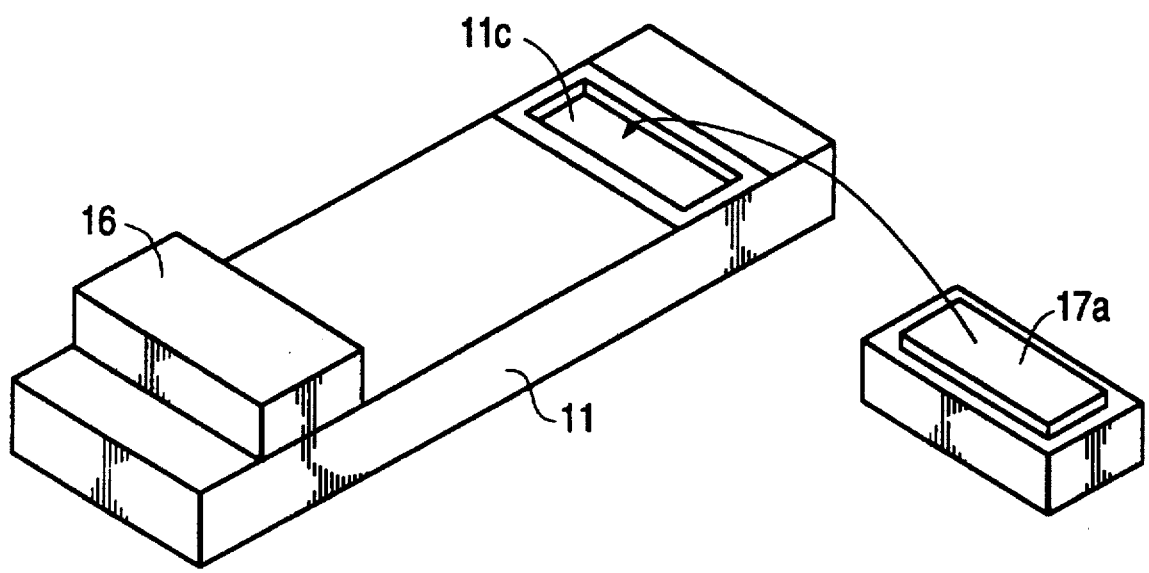
FIGS. 7(A)–(B) are isometric views of an ultrasonic motor in accordance with the fourth embodiment of the present invention.
Figure 7B:
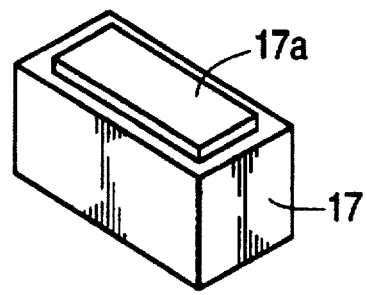
Figure 8:
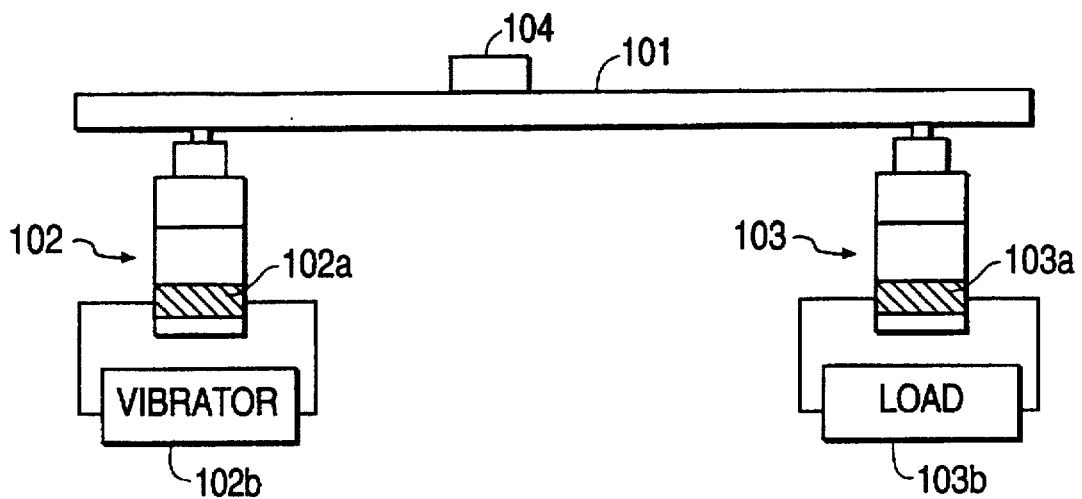
FIG. 8 is an isometric view of an ultrasonic motor in accordance with the prior art.
Figure 9C:
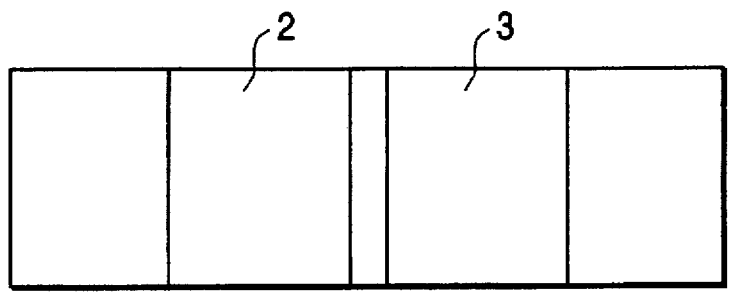
FIG. 9(C) is a top view of an ultrasonic motor in accordance with the prior art.
Figure 9A:
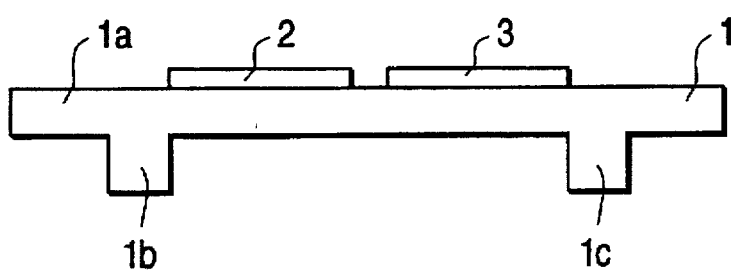
FIG. 9(A) is a side view of an ultrasonic motor in accordance with the prior art.
Figure 9B:
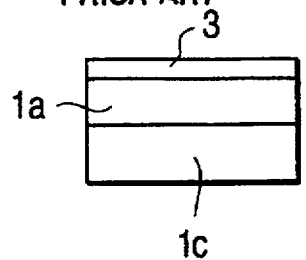
FIG. 9(B) is a side view of an ultrasonic motor in accordance with the prior art.

FIGS. 7(A)–(B) show an ultrasonic motor according to a fourth preferred embodiment of the present invention. In the ultrasonic motor according to the fourth embodiment, the take-off members 16 and 17 are made of a different material than that of elastic body 11. Preferably, the elastic body 11 is made of an aluminum alloy, and the take-off members 16 and 17 are made of nickel, forming a light-weight ultrasonic motor with a hard slide surface, reducing the necessity for slide members.

In order to securely bond the driving force output members 16 and 17 to the elastic body 11, the driving force output members 16 and 17 are provided with convex part 17a. Conversely, elastic body 11 is formed with a concave part 11c.

Although the fourth embodiment of the present invention has been described with respect to a specific configuration, it will be recognized that the fourth embodiment is not limited to the specific configurations. For example, the driving force output member 16 can be a different size than the driving force output member 17, allowing the ultrasonic motor to be customized for different installations. Further, the materials of the elastic body 11 and the take-off members 16 and 17 are not limited to those described above. For example, the elastic body 11 may be stainless steel, while the take-off members 16 and 17 may be a highly anti-abrasion resin (for example, 80% (W) ethylene tetrafluoride, 15% (W) glass fiber, and 5% (W) molybdenum disulfide) for improved durability.

Further, the materials of take-off members 16 and 17 do not need to be the same. Specifically, when it is desired that the speeds of the take-off members differ depending on the direction of advance (for example, when the route out advances slowly in order to determine precise position, and the route back returns quickly in order to recover) it is preferable that the materials of take-off members 16 and 17 differ.

In addition, the take-off members 16 and 17 may be joined to the elastic body 11, by other mechanical means such as screw stops.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A vibration motor comprising:

an elongated elastic body having a first surface and a second surface;

a pair of piezo-electric elements for receiving input voltages, said piezo-electric elements being attached to the first surface of said elongated elastic body;

first and second driving force output members depending from said elongated elastic body;

a first patterned slide member comprising a first and second strip which extend along opposite sides of said first driving force output member; and a second patterned slide member comprising a first and second strip which extend along opposite sides of said second driving force output member.

2. A vibration motor comprising:

an elongated elastic body having a first surface and a second surface;

a pair of piezo-electric elements for receiving input voltages, said piezo-electric elements being attached to the first surface of said elongated elastic body;

first and second driving force output members depending from said elongated elastic body;

a first patterned slide member comprising a strip extending around the periphery of said first driving force output member; and a second patterned slide member comprising a strip extending around the periphery of said second driving force output member.

3. A vibration motor comprising:

an elongated elastic body having a first surface and a second surface;

a pair of piezo-electric elements for receiving input voltages, said piezo-electric elements being attached to the first surface of said elongated elastic body;

first and second driving force output members depending from said elongated elastic body;

a first patterned slide member comprising a first and second strip which extend across said first driving force output member; and a second patterned slide member comprising a first and second strip which extend across said second driving force output member.

4. A vibration motor comprising:

an elongated elastic body having a first surface and a second surface;

a pair of piezo-electric elements for receiving input voltages, said piezo-electric elements being attached to the first surface of said elongated elastic body;

first patterned slide member affixed to said elongated elastic body, said first patterned slide member comprised of a plurality of raised dots; and a second patterned slide member affixed to said elongated elastic body, said second patterned slide member comprised of a plurality of raised dots.

5. A vibration motor comprising:

an elongated elastic body having a first surface and a second surface;

a pair of piezo-electric elements for receiving input voltages, said piezo-electric elements being attached to the first surface of said elongated elastic body;

a first patterned slide member affixed to said elongated elastic body, said first patterned slide member comprised of a plurality of raised squares; and a second patterned slide member affixed to said elongated elastic body, said second patterned slide member comprised of a plurality of raised squares.

6. A vibration motor comprising:

an elongated elastic body having a first surface and a second surface;

a pair of piezo-electric elements for receiving input voltages, said piezo-electric elements being attached to the first surface of said elongated elastic body;

a first patterned slide member affixed to said elongated elastic body, said first patterned slide member comprised of a plurality of raised strips; and a second patterned slide member affixed to said elongated elastic body, said second patterned slide member comprised of a plurality of raised strips.

7. A vibration motor comprising:

an elongated elastic body having a first surface and a second surface;

a pair of piezo-electric elements for receiving input voltages, said piezo-electric elements attached to the first surface of said elongated elastic body;

a first patterned slide member affixed to said elongated elastic body, said first patterned slide member comprised of a plurality of raised triangles; and a second patterned slide member affixed to said elongated elastic body, said second patterned slide member comprised of a plurality of raised triangles.

8. A vibration motor comprising:

a vibration member having an elastic member and an electro-mechanical converting element attached to the elastic member, said vibration member generates vibrations by applying a first periodic signal to a first input portion of the electro-mechanical converting element and a second periodic signal, having a different phase from the first periodic signal, to a second input portion of the electro-mechanical converting element;

a relative moving member which is moved by the vibrations;

a first patterned slide member having an uneven pattern which comprises raised first and second portions which contact said relative moving member and extend along opposite sides of the first patterned slide member; and a second patterned slide member having an uneven pattern which comprises first and second portions which contact said relative moving member and extend along opposite sides of the second patterned slide member.

9. A vibration motor comprising:

a vibration member having an elastic member and an electro-mechanical converting element attached to the elastic member, said vibration member generates vibrations by applying a first periodic signal to a first input portion of the electro-mechanical converting element and a second period signal, having a different phase from the first periodic signal, to a second input portion of the electro-mechanical converting element;

a relative moving member which is moved by the vibrations;

a first patterned slide member having an uneven pattern which comprises a portion contacting said relative moving member and extending around the periphery of the first patterned slide member; and a second patterned slide member having an uneven pattern which comprises a portion contacting said relative moving member and extending around the periphery of the second patterned slide member.

10. A vibration motor comprising:

a vibration member having an elastic member and an electro-mechanical converting element attached to the elastic member, said vibration member generates vibrations by applying a first periodic signal to a first input portion of the electro-mechanical converting element and a second periodic signal, having a different phase from the first periodic signal, to a second input portion of the electro-mechanical converting element;

a relative moving member which is moved by the vibrations;

a first patterned slide member having an uneven pattern which comprises first and second portions contacting said relative moving member and extending across the first patterned slide member; and a second patterned slide member having an uneven pattern comprising first and second portions contacting said relative moving member and extending across the second patterned slide member.

11. A vibration motor comprising:

a vibration member having an elastic member and an electro-mechanical converting element attached to the elastic member, said vibration member generates vibrations by applying a first periodic signal to a first input portion of the electro-mechanical converting element and a second periodic signal, having a different phase from the first periodic signal, to a second input portion of the electro-mechanical converting element;

a first patterned slide member coupled to said elastic member, said first patterned slide member comprises a plurality of dots; and a second patterned slide member coupled to said elastic member, said second patterned slide member comprises a plurality of dots.

12. A vibration motor comprising:

a vibration member having an elastic member and an electro-mechanical converting element attached to the elastic member, said vibration member generates vibrations by applying a first periodic signal to a first input portion of the electro-mechanical converting element and a second periodic signal, having a different phase from the first periodic signal, to a second input portion of the electro-mechanical converting element;

a first patterned slide member coupled to said elastic member, said first patterned slide member comprises a plurality of squares; and a second patterned slide member coupled to said elastic member, said second patterned slide member comprises a plurality of squares.

13. A vibration motor comprising:

a vibration member having an elastic member and an electro-mechanical converting element attached to the elastic member, said vibration member generates vibrations by applying a first periodic signal to a first input portion of the electro-mechanical converting element and a second periodic signal, having a different phase from the first periodic signal, to a second input portion of the electro-mechanical converting element;

a first patterned slide member coupled to said elastic member, said first patterned slide member comprises a plurality of strips; and a second patterned slide member coupled to said elastic member, said second patterned slide member comprises a plurality of strips.

14. A vibration motor comprising:

a vibration member having an elastic member and an electro-mechanical converting element attached to the elastic member, said vibration member generates vibrations by applying a first periodic signal to a first input portion of the electro-mechanical converting element and a second periodic signal, having a different phase from the first periodic signal, to a second input portion of the electro-mechanical converting element;

a first patterned slide member affixed to said elastic member, said first patterned slide member comprises a plurality of triangles; and a second patterned slide member affixed to said elastic member, said second patterned slide member comprises a plurality of triangles.

* * * * *